(12) United States Patent
Holmeide et al.

(10) Patent No.: US 8,291,105 B2
(45) Date of Patent: Oct. 16, 2012

(54) METHOD FOR SYNCHRONIZATION IN A LOCAL AREA NETWORK INCLUDING A STORE-AND-FORWARD DEVICE

(75) Inventors: Øyvind Holmeide, Oslo (NO); Tor Skeie, Hønefoss (NO); Christoffer Apneseth, Oslo (NO); Svein Johannessen, Oslo (NO); Trond Lokstad, Nesoddtangen (NO)

(73) Assignee: ABB Research Ltd., Zurich (CH)

( * ) Notice: Subject to any disclaimer, the term of this patent is extended or adjusted under 35 U.S.C. 154(b) by 2933 days.

(21) Appl. No.: 10/465,945

(22) PCT Filed: Dec. 28, 2001

(86) PCT No.: PCT/NO01/00515
§ 371 (c)(1),
(2), (4) Date: Nov. 12, 2003

(87) PCT Pub. No.: WO02/054661
PCT Pub. Date: Jul. 11, 2002

(65) Prior Publication Data
US 2004/0151125 A1    Aug. 5, 2004

(30) Foreign Application Priority Data
Dec. 28, 2000 (NO) .................................. 20006683

(51) Int. Cl.
*G06F 15/16* (2006.01)
*G06F 11/00* (2006.01)
*G08C 15/00* (2006.01)
*H04L 1/00* (2006.01)

(52) U.S. Cl. .......................... 709/232; 370/252; 709/248

(58) Field of Classification Search ................. 709/248, 709/232; 370/252
See application file for complete search history.

(56) References Cited

U.S. PATENT DOCUMENTS
5,025,457 A    6/1991    Ahmed
(Continued)

FOREIGN PATENT DOCUMENTS
EP    303830 A2 *    2/1989
(Continued)

OTHER PUBLICATIONS

Mitzenmacher, 'Constant Time Per Edge is Optimal on Rooted Tree Networks', Distributed Computing, vol. 10, No. 4, pp. 189-197, 1997.*

(Continued)

*Primary Examiner* — George C Neurauter
(74) *Attorney, Agent, or Firm* — Michael M. Rickin; Paul R. Katterle; Robert P. Nupp

(57) ABSTRACT

The present invention relates to a method for identifying inaccurate time measurements in a local area network. The local area network comprises a sending device (2), such as a time client, a destination device (3), such as a timeserver, and a switching device and/or a store-and-forward device (6). A time request packet (4) is rejected if it arrives at the time client or timeserver within a given or calculated minimum distance from the preceding network packet. The time request packet (4) is also rejected if it falls outside a set of calculated error limits based on a set of estimates. Those estimates are kept in the time client memory and updated according to a given set of rules.

5 Claims, 1 Drawing Sheet

U.S. PATENT DOCUMENTS

| | | | |
|---|---|---|---|
| 5,090,024 A * | 2/1992 | Vander Mey et al. | 375/139 |
| 5,535,217 A | 7/1996 | Cheung et al. | |
| 5,602,992 A * | 2/1997 | Danneels | 709/248 |
| 5,737,531 A * | 4/1998 | Ehley | 709/208 |
| 5,812,749 A | 9/1998 | Fernandez et al. | |
| 5,901,138 A * | 5/1999 | Bader et al. | 370/229 |
| 6,031,818 A * | 2/2000 | Lo et al. | 370/216 |
| 6,038,239 A * | 3/2000 | Gabbert | 372/20 |
| 6,055,578 A * | 4/2000 | Williams et al. | 709/253 |
| 6,075,791 A * | 6/2000 | Chiussi et al. | 370/412 |
| 6,378,069 B1 * | 4/2002 | Sandler et al. | 713/153 |
| 6,389,480 B1 * | 5/2002 | Kotzur et al. | 709/249 |
| 6,438,702 B1 * | 8/2002 | Hodge | 713/400 |
| 6,625,657 B1 * | 9/2003 | Bullard | 709/237 |
| 6,680,921 B1 * | 1/2004 | Svanbro et al. | 370/324 |
| 6,870,876 B1 * | 3/2005 | Nohlgren et al. | 375/220 |
| 6,941,383 B1 * | 9/2005 | Getsin et al. | 709/248 |
| 6,961,857 B1 * | 11/2005 | Floryanzia | 726/14 |
| 6,985,966 B1 * | 1/2006 | Gupta et al. | 709/248 |
| 7,103,124 B1 | 9/2006 | Lindskog et al. | |
| 7,243,136 B2 * | 7/2007 | Huston et al. | 709/217 |
| 7,428,243 B2 * | 9/2008 | Marchetto | 370/468 |
| 7,443,811 B2 * | 10/2008 | Sturrock et al. | 370/282 |
| 2001/0004362 A1 * | 6/2001 | Kamiya | 370/416 |
| 2001/0012270 A1 * | 8/2001 | Godoroja | 370/230 |
| 2002/0078243 A1 * | 6/2002 | Rich et al. | 709/248 |
| 2004/0064517 A1 * | 4/2004 | Uenoyama et al. | 709/207 |
| 2005/0210153 A1 * | 9/2005 | Rich et al. | 709/248 |
| 2005/0210306 A1 * | 9/2005 | Rich et al. | 713/400 |

FOREIGN PATENT DOCUMENTS

| | | |
|---|---|---|
| EP | 571189 A1 * | 11/1993 |
| EP | 0697774 A1 | 2/1996 |
| EP | 713347 A2 * | 5/1996 |
| EP | 800289 A2 * | 10/1997 |
| EP | 01995821.4 | 8/2006 |
| WO | WO9836540 A1 * | 8/1998 |
| WO | WO9965197 A1 * | 12/1999 |
| WO | WO02054661 | 7/2002 |

OTHER PUBLICATIONS

Kwak, 'An Integrated Network Traffic Control System for High-Speed Packet-Switched Wide-Area Networks', University of Iowa, 1993.*

Forbath et al., '100-Mbps Ethernet Eases the Bandwidth Blues', Business Communications Review, v25, n4, p. 29(4), Apr. 1995.*

Taschek et al., 'Networking Smarter: Expert Tips and Techniques for Tapping Into Your Network's Hidden Strengths', PC-Computing, v6, n7, p. 300, Jul. 2, 1993.*

* cited by examiner

Minimum Interpacket Gap

METHOD FOR SYNCHRONIZATION IN A LOCAL AREA NETWORK INCLUDING A STORE-AND-FORWARD DEVICE

FIELD OF THE INVENTION

A method for identifying inaccurate time measurements in a local area network incorporating a central switch and/or a store-and-forward device.

BACKGROUND OF THE INVENTION

Several schemes exist for synchronizing a time-of-day clock in one node, such as a time client, to a reference time-of-day clock in another node, such as a timeserver, over a local area network (LAN). Most of the time-of-day clocks attain their stated accuracy only when a network transfer delay between the time client and the timeserver is constant. Introduction of switched Ethernet created a class of local area networks where network capacity was greatly enhanced at the expense of a predictable delay between the time one network node transmits a time request packet and the time the destination node receives it. A reason for this is that the link to the destination node may be busy with other packets when the aforesaid packet is ready to be placed on that link. In such cases the packet is stored in the switch, which therefore is also a store-and-forward device, until the link to the destination node is free.

SUMMARY OF THE INVENTION

The object of the invention is to provide a method for identifying inaccurate time measurements in a local area network incorporating a central switch and/or a store-and-forward device.

This object is achieved by a method according to the independent claims 1 and 2.

A network incorporating a store-and-forward device, like the switch in a switched Ethernet network, has two distinct sources of delay. The first source of delay is the connection from the sending device, such as the time client, to the store-and-forward device and the second source of delay is the connection from the store-and-forward device to the destination device, such as the time server 4. This invention will address both sources, using two distinct algorithms.

DETAILED DESCRIPTION OF THE PREFERRED EMBODIMENTS

Figure 1:
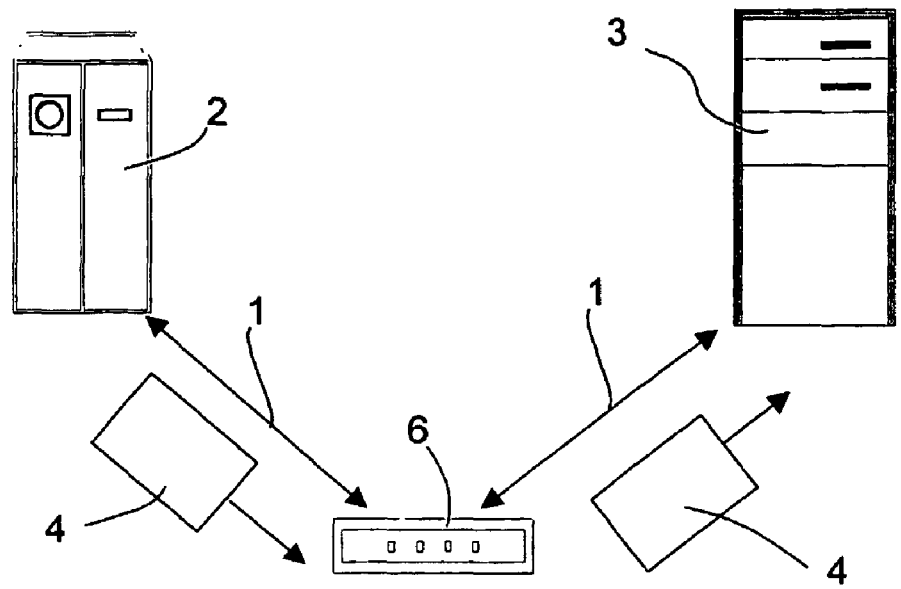
FIG. 1 is a schematic block diagram of a computer network, such as a LAN, comprising a time client, a timeserver and a central switch and/or a store-and forward device.

FIG. 1 shows a schematic block-diagram of a computer network 1, such as a local area network, comprising a time client 2 and a timeserver 3. A switching device and/or a store-and-forward device 6 are/is in the path between the time client and the timeserver. A time request packet 4 is transmitted from the time client 2 to the timeserver 3 and from the timeserver to the time client.

It is presupposed that the time request packets 4 are time stamped at the end of the time request packets. The reason for this is that it is only ensured that a time request packet has been fully received or transmitted at the end of the time request packet. If the time request packet is time stamped before the end, the time request packet might be aborted before transmission or reception has been completed.

Figure 2:
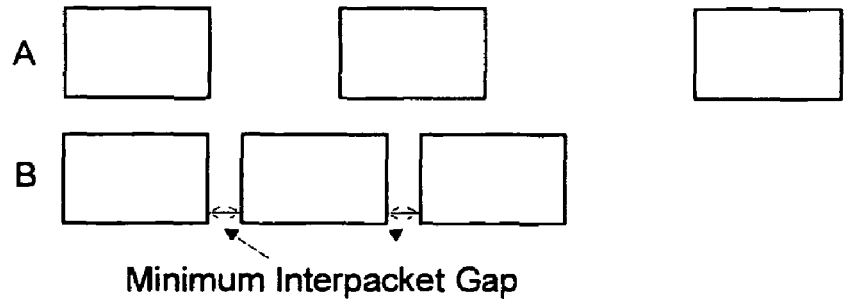
FIG. 2 shows an example of normal packet arrivals and queued packet arrivals.

In the following examples the time client 2 is working as a sending device and the timeserver 3 is working as a destination device. This should be seen as an example only. When the time request packet 4 is transferred from the timeserver 3 to the time client 2 the timeserver is working as a sending device and the time client is working as a destination device When a time request packet 4 is transmitted from the store-and-forward device 6 to the timeserver 3, i.e. the destination device, the time request packet might be stored in the store-and-forward device 6 waiting for other packets to finish using the link to the timeserver. The time request packet 4 will be sent as soon as possible. This means that it will be sent after the preceding packet followed by a specified Minimum Interpacket Gap, shown in FIG. 2. The specified Minimum Interpacket Gap for Ethernet is given by the IEEE 802.3 and ISO 8802/3 standards. Since the length of the time synchronization packet is known as well as the length of the additional bits associated with packet transmission, such as preamble, checksum etc., a minimum time distance between the end of the preceding packet and the end of the time synchronization packet may be calculated. The time distance between the end of the preceding packet and the end of the time request packet 4 is measured in the destination device, in this example the timeserver 3. If the measured time distance is within a given tolerance of this minimum time distance t, it is concluded that the time request packet 4 was delayed in the switch and/or the store-and-forward device and therefore the time measurement associated with it will be inaccurate. The delayed packet will not be used for time calculations. FIG. 2 shows an example of normal time request packet arrivals A and queued time request packets arrival B.

If the measured time distance is greater than the Minimum Interpacket Gap the time request packet 4 has not been delayed in the switch and/or store-and-forward device and the time stamps may be used to synchronize the time client 2 and the time server 3.

If there are delays on the link from the sending device to the store-and-forward device, an alternative procedure for validating the time stamp accuracy must be used.

Figure 3:
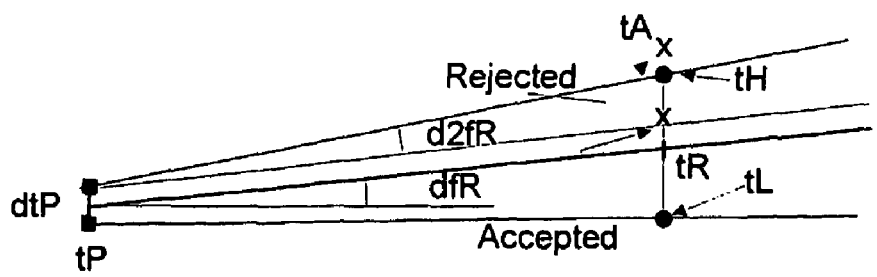
FIG. 3 shows an example of accepting or rejecting a measurement based on estimates.

FIG. 3 shows how the time stamp accuracy is validated when it has been a delay on the link 1 from the sending device, for example, the time client 2, to the switching device and/or store-and-forward device. This procedure is based on a certain degree of confidence in the local time-of-day clock. This confidence is expressed in four variables: estimated relative local frequency deviation dfR, estimated local frequency accuracy d2fR, estimated local time precision dtP and a confidence level. Start values for the estimated relative local frequency deviation dfR and the estimated local frequency accuracy d2fR are stored in the time client when the time client is manufactured, together with a comparison value for the confidence level variable. The confidence level variable always starts at 0 and as long as it is less than the comparison value, there is a low confidence in the estimates. When the confidence level variable is greater than or equal to the comparison value, there is a high confidence in the estimates.

When a new time adjustment tA is calculated from the time stamps, it is decided whether to keep the adjustment or reject it according to, for example, the following algorithm:

1. First an upper acceptance level tH or a lower acceptance level tL for the new time adjustment tA is calculated:

$$tB=tP+(tR-tP)*(1+dfR)$$

$$dtB=dtP+(tR-tP)*d2fR$$

$$tH=tB+dtB$$

$$tL=tB-dtB$$

where tP is the value of the local clock at a previously accepted time adjustment, tR is the value of the local clock at the current time request, dfR is the estimated relative local frequency deviation, dtP is the estimated local time precision at the previously accepted time adjustment and d2fR is the estimated local frequency accuracy at the same point in time. The range between the upper acceptance level tH and the lower acceptance level tL is called the error range.

2. If tA falls within the error range, tA is accepted and used to update local time, estimated local frequency and estimated frequency drift. In addition, the confidence level is increased up to a predefined limit.

3. If there is a high confidence in our estimates and tA does not fall within the error range, tA is rejected and the confidence level in our estimates is decreased to a value greater than 0.

4. If there is a low confidence in our estimates and tA does not fall within the error range, there are several options. A first option is to reject tA, decrease the confidence level and hope for a better tA in the future.

A second option is to introduce a new set of estimates together with a time-of-day offset. When the new set of estimates has been introduced every new time adjustment tA must be checked against every set of estimates until one of the confidence levels becomes high. At that point in time, that set of estimates is kept and the others are deleted. The next time adjustment tA will fulfill the requirements in either the time client 2 or the timeserver 3.

The invention claimed is:

1. A method for identifying inaccurate time measurements when running time synchronization on a local area network, the local area network comprising a sending device, a destination device and a switching device and/or a store-and-forward device arranged on a path between the sending device and the destination device, the method comprising:

storing a value for an estimated relative local frequency deviation (dfR) and a confidence comparison value for a local time-of-day clock in a memory in the sending device;

obtaining a time value (tP) of the local time-of-day clock at a previous time adjustment;

obtaining an estimated local frequency accuracy (d2fR) at the previous time adjustment;

obtaining an estimated local time precision (dtP) at the previous time adjustment;

receiving time stamps;

calculating a new time adjustment (tA) from the received time stamps;

obtaining a time value (tR) of the local time-of-day clock for the new time adjustment (tA);

calculating an upper acceptance level (tH) and a lower acceptance level (tL) for the new time adjustment (tA) based on the following equations:

$$tH=tB+dtB$$

$$tL=tB-dtB$$

where tB=tP+(tR−tP)*(1+dfR) and dtB=dtP+(tR−tP)*d2fR; and determining whether the new time adjustment (tA) falls between tH and tL.

2. The method of claim 1, wherein the sending device is a time client.

3. The method of claim 1, further comprising:

if the new time adjustment (tA) falls between tH and tL, accepting the new time adjustment (tA) and updating the time value of the local time-of-day clock.

4. A method for identifying inaccurate time measurements when running time synchronization on a local area network, the local area network comprising a sending device, a destination device and a switching device and/or a store-and-forward device connected between the sending device and the destination device, the method comprising:

receiving a network packet and then a time request packet at the destination device;

measuring the time between the received network packet and the received time request packet; and rejecting the received time request packet if the measured time is within a predetermined time interval, wherein the predetermined time interval is calculated using a known length of a time request packet and a required inter-packet gap.

5. The method of claim 4, wherein the step of calculating the predetermined time interval comprises calculating a minimum time interval using the known length of a time request and the required inter-packet gap and adding a tolerance to the minimum time interval.

\* \* \* \* \*